US009237143B1

(12) United States Patent
Dotan et al.

(10) Patent No.: US 9,237,143 B1
(45) Date of Patent: Jan. 12, 2016

(54) USER AUTHENTICATION AVOIDING EXPOSURE OF INFORMATION ABOUT ENUMERABLE SYSTEM RESOURCES

(71) Applicant: EMC Corporation, Hopkinton, MA (US)

(72) Inventors: Yedidya Dotan, Newton, MA (US); Lakshmi Suresh, Westford, MA (US); John Watts, Medford, MA (US); Paul Dennis, Wayland, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/038,563

(22) Filed: Sep. 26, 2013

(51) Int. Cl.
*H04L 29/06* (2006.01)
(52) U.S. Cl.
CPC ...................................... *H04L 63/08* (2013.01)
(58) Field of Classification Search
USPC .............................................................. 726/3
See application file for complete search history.

(56) References Cited

U.S. PATENT DOCUMENTS

| | | | |
|---|---|---|---|
| 8,312,540 B1* | 11/2012 | Kahn et al. ....................... 726/22 |
| 8,745,698 B1* | 6/2014 | Ashfield et al. .................... 726/4 |
| 8,904,506 B1* | 12/2014 | Canavor et al. ..................... 726/7 |
| 2001/0055388 A1* | 12/2001 | Kaliski, Jr. ....................... 380/30 |
| 2003/0154406 A1* | 8/2003 | Honarvar et al. ............. 713/201 |
| 2005/0124288 A1* | 6/2005 | Karmi et al. ................... 455/3.01 |
| 2009/0138592 A1* | 5/2009 | Overcash et al. ............. 709/224 |
| 2010/0192201 A1* | 7/2010 | Shimoni et al. .................... 726/3 |
| 2010/0235918 A1* | 9/2010 | Mizrahi et al. ................... 726/25 |

\* cited by examiner

*Primary Examiner* — Mahfuzur Rahman
(74) *Attorney, Agent, or Firm* — BainwoodHuang

(57) ABSTRACT

Authentication employs a classification that monitors content of authentication requests and results and assigns and records risk values identifying low-risk sources making normal authentication requests and high-risk sources making abnormal authentication requests indicative of fraud activity. Then for low-risk sources, a normal authentication process is employed having differential success/fail behavior exposing information about an enumerable system resource, such as a user account. Example differential behavior includes (a) granting access when a request identifies a valid user account, and (b) otherwise denying access, enabling an attacker to learn whether a guessed value identifies an existing account. For high-risk sources, a false authentication process is employed having non-differential success/fail response behavior that does not expose the information, such as consistent presentation of a service denial message irrespective of whether the request identifies a valid existing user account, preventing an enumeration attack.

17 Claims, 3 Drawing Sheets

USER AUTHENTICATION AVOIDING EXPOSURE OF INFORMATION ABOUT ENUMERABLE SYSTEM RESOURCES

BACKGROUND

The present invention is related to the field of user authentication in computer systems. Computer systems generally, and in particular computer systems providing services over publically accessed networks, are vulnerable to a variety of attacks by which an attacker obtains unauthorized access to system resources. One type of attack, which may be used as a prelude to other, more targeted attacks, is an enumeration attack in which an attacker makes a series of attempts to access a system and observes the system's response so as to glean information about system resources. One well known example involves enumeration of account identifiers (IDs). An attacker generates a series of system login requests containing guessed-at account IDs that may or may not match valid IDs of accounts of the system. If the system responds differently to login attempts containing IDs that match valid IDs than to login attempts containing IDs that do not match valid IDs, then by observing this differential behavior the attacker learns or "enumerates" the accounts existing in the system. This specific information can then be used in subsequent attacks that are more targeted to the specific existing accounts.

SUMMARY

Differential response to a series of login attempts or similar actions of an attacker, such as in the example above, exposes information about a system that can be used to mount more targeted attacks against the system. Beyond the above example in which the information is an identify of a valid existing account, in other cases the behavior might reveal information about authentication procedures or policies that the system uses, and/or a sensitivity level of resources from a security perspective. For example, if a given account requires use of a stronger authentication process beyond a regular authentication process used for other accounts, then it can be inferred that the given account may provide greater access or control in the system and thus be attractive to an attacker for purposes of maximizing damage.

A disclosed technique is directed to eliminating or at least reducing a level of information provided to potential attackers during authentication processing that occurs upon initial access to a computer system. In one general respect, the technique employs non-differential behavior that does not convey the type of information that can be conveyed by conventional differential authentication behavior, such as in the above example. Because a potential attacker is presented with the same response irrespective of whether the attacker identifies valid, existing system resources (e.g., accounts), the attacker cannot mount an enumeration attack based on responses of the system during authentication.

More particularly, a method is disclosed of processing authentication requests for authentication of unauthenticated users attempting to access a protected system. In an ongoing classification operation, the content of the authentication requests and resulting authentication results are monitored. Based on the monitoring, risk values are assigned and recorded in association with information identifying the sources of the authentication requests. The recorded risk values identify low-risk sources making normal authentication requests and high-risk sources making abnormal authentication requests indicative of fraud activity.

For new authentication requests for sources identified by the recorded risk values as low-risk sources, a normal authentication process is employed that has differential success/fail response behavior that exposes information about an enumerable access control resource of the protected system. For example, the access control resource may be a user account, and the differential behavior may be the conventional response of (a) granting access to the system when an access request identifies a valid existing user account, and (b) denying access to the system when the access request does not identify a valid existing user account.

For new authentication requests for sources identified by the recorded risk values as high-risk sources, a false authentication process is employed that has non-differential success/fail response behavior that does not expose the information about the enumerable access control resource. Continuing with the above example, the non-differential behavior may be to consistently present a service denial message to the source of the request, irrespective of whether the request identifies a valid existing user account (i.e., the "success" case) or it does not identify a valid existing user account (the "fail" case). Because a potential attacker is presented with the same response in both cases, the attacker cannot successfully enumerate system resources based on the responses during authentication.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
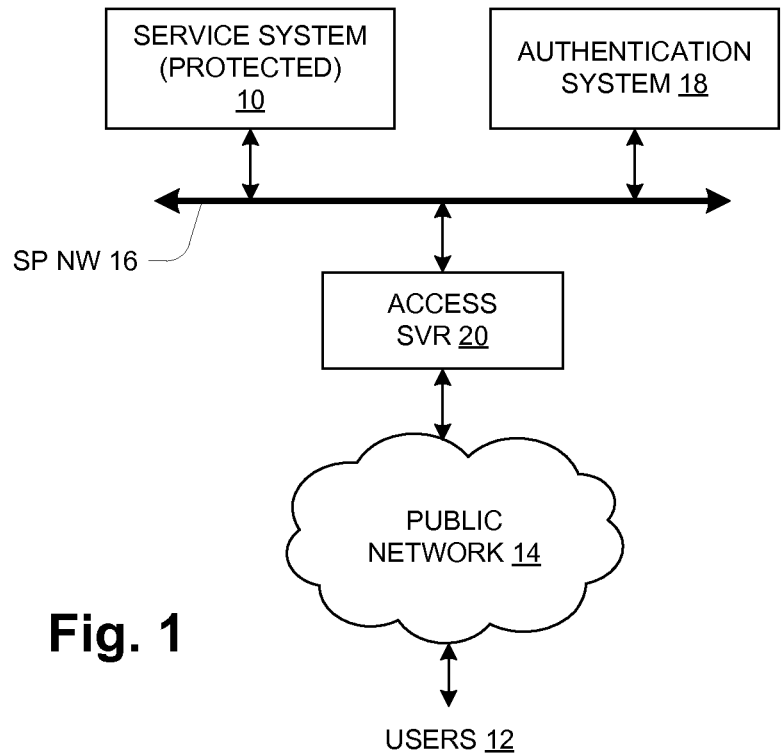
FIG. 1 is a block diagram of a computer system.

FIG. 1 shows a distributed computing system in which a service system 10 provides services to users 12 via a public network 14. The service system 10 is operated by a service provider (SP) and deployed on a private service provider network (SP NW) 16. Also connected to the SP network 16 are an authentication system 18 and an access server (ACCESS SVR) 20, the latter also being connected to the public network 14.

The service system 10 may provide services in the form of so-called web applications, i.e., distributed applications that may require execution of server-provided executable code in a browser of a client machine of a user 12 accessing the service. There is widespread use of such distributed applications today, including subscription-based content access (e.g., an online newspaper or magazine), financial services (online stock trading, banking, etc.), and other services. A given user 12 is typically known to the service system 10 through the use of user-specific computer accounts maintained by the service provider. During account establishment, a user 12 is assigned an identity (e.g., user name or account name/number) and a private credential that is presented at a time of using the service. One well-known example of a private credential is a password. In the illustrated arrangement, the service system 10 is also referred to as a "protected"

system, meaning that access and use of the service system 10 by the users 12 is controlled by security mechanisms that include authentication operations as described further below.

The access server 20 serves as a gateway for access to the service system 10 by the users 12. It may perform any or all of a number of typical access functions, including firewall, routing, load balancing, and so-called "AAA" functions (Authentication, Authorization, and Accounting). With respect to authentication in particular, the access server 20 may serve as the point of enforcement of user authentication policies that are in place in the SP network 16, and in this role it interacts with the authentication system 18 to obtain specialized authentication services as described more below.

The authentication system 18 provides user authentication services within the SP network 16. In operation, upon a user 12 accessing the SP system via the access server 20, the access server 20 may either consult the authentication system 18 or redirect a user request to the authentication system 18 for authentication processing. Successful authentication is required before the user is allowed access to the service provided by the service system 10. In some cases, the authentication system 18 may provide a complete response indicating whether or not (and under what constraints) a given user access request is granted, and this response is used as an internal permission in the SP network 16 to enable the requested service to be provided. In other cases, the authentication system 18 may provide a response containing information that can be used by a separate mechanism that decides whether access is to be granted. Such a mechanism may be in the access server 20 and/or the service system 10. As an example of this operation, the authentication system 18 may provide a non-binary authentication result, such as a numeric score indicating a level of confidence in the authenticity of the request, and the separate mechanism may compare this result with some threshold according to an authentication policy. The comparison result then serves as the binary decision whether access is granted (e.g., whether or not the score exceeds the threshold).

The arrangement in FIG. 1 is useful for this description, and in some cases it may reflect organization of an embodiment of the presently disclosed technique. In other embodiments the service provider system may be organized differently than as shown in FIG. 1. For example, authentication operations may be merged into an access server 20, or in some systems all the functions may be included in each of one or more servers deployed by the service provider.

As outlined above, computer systems in general and publically accessible system in particular are vulnerable to attacks that may include enumeration behavior, i.e., repeated fraudulent access attempts that are designed to elicit system responses that the attacker can use to obtain information about system resources, policies, etc. Information obtained in this manner can then be used by the same attacker or others to make more targeted attacks. As an example, in a guessing attack an attacker can perform repeated login attempts using a succession of candidate user identities (IDs) that are generated by the attacker. The system may respond differently for valid user IDs (i.e., IDs that happen to match the IDs for existing valid user accounts in the system) and invalid user IDs (those not matching the IDs of any existing valid user accounts). For example, if an invalid user ID is presented the system may respond with an error message and not request a password or other credential, whereas if a valid user ID is presented the system may respond with an invitation to present the credential. By this differential response behavior, the attacker learns whether a given user ID is valid in the system, and by repeating these attempts for a number of generated user IDs the attacker may identify or "enumerate" many or all the active, valid user accounts in the system. This specific information about existing accounts can then be used in a separate, more targeted attack.

More generally, the response of a system may provide information in any of multiple ways. It may provide identification of system resources such as user or account IDs. It may also provide information about the kind of authentication policies that are being used, and whether different policies are used for different resources. This latter information can also identify resources that may be more sensitive than others. For example, certain users may be administrative or management users (e.g., "power" users) given much greater authority and/or control in the operation of the service, and the authentication for these users may use a different and stronger process than a more routine authentication process used for normal users. For example, some users may be required to engage in a token-based one-time password (OTP) process in addition to a conventional password-based process. Alternatively, knowledge-based authentication (KBA) may be used. If an attacker sees the system engaging in a different (stronger) authentication process for a given user ID, it can infer that this user ID belongs to a more powerful user, so this user account can be singled out for further specific attack to increase the damage the attacker can inflict.

Thus one goal of operation of the authentication system 18 is to eliminate or at least reduce the amount of information provided to an attacker during an authentication process, specifically information that can be learned by observing differential behavior (behavior that differs depending on some aspect of the request, e.g., whether it is directed to a valid user account, involves a power user or sensitive operation, etc.). Certain operations described below are used in furtherance of this goal.

Figure 2:
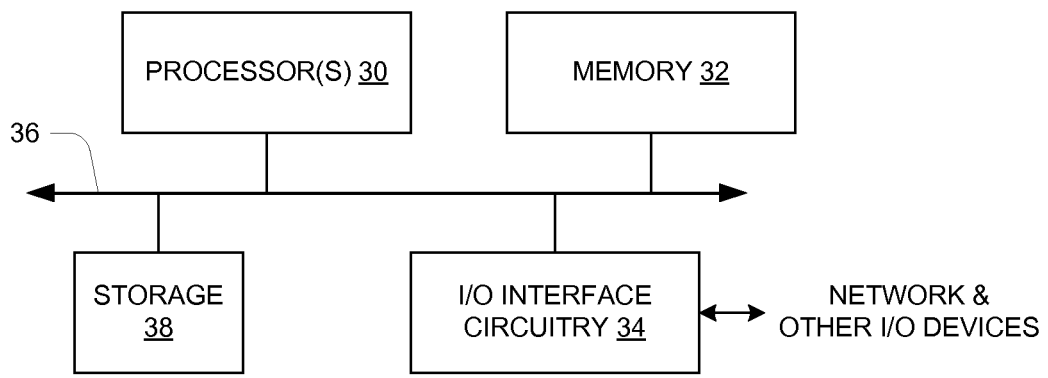
FIG. 2 is a block diagram of a computer or computerized device from a hardware perspective.

FIG. 2 shows an example configuration of a physical computer such as a server from a computer hardware perspective. One or more such servers may be employed in the service system 10, authentication system 18 and access server 20. The illustrated configuration also represents organization of a client computer of a user 12, such as a personal computer, tablet computer, smart phone or other mobile device, etc. The computer hardware includes one or more processors 30, memory 32, and interface circuitry 34 interconnected by data interconnections 36 such as one or more high-speed data buses. The interface circuitry 34 provides a hardware connection to the external interconnect (e.g., network 14 or 16 of FIG. 1) and perhaps other external devices/connections (EXT DEVs). The processor(s) 30 with connected memory 32 may also be referred to as "processing circuitry" herein. There may also be local non-volatile storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of an authentication application, such as described below, can be referred to as an authentication circuit or authentication component, and it will be understood that a collection of such circuits or components can all be realized and interact with each other as one or more sets of computer processing hardware executing different computer programs as generally known in the art.

Figure 3:
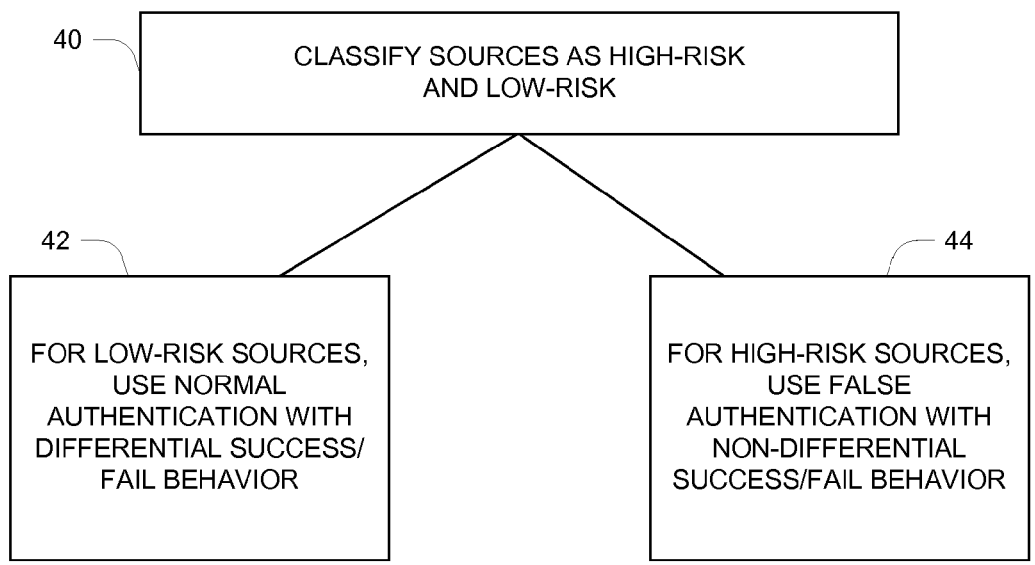
FIG. 3 is a flow diagram of operation of an authentication process.

FIG. 3 is a high-level flow diagram for an authentication process as may be performed by the authentication system 18 of FIG. 1.

At 40 is an ongoing process of classifying the sources of authentication requests as either high-risk or low-risk.

"Source" in this context refers to the source of access requests as uniquely identified by information included in access requests apart from information identifying a system resource (such as a user account) that is being accessed. In one example, access requests received at the access server 20 are carried in network-level packets that include source network addresses, for example, which are assigned as unique addresses to computers generating network traffic. A common example is an Internet Protocol (IP) address. Individual distinct IP addresses may be taken as identifying different sources of authentication requests.

The classification occurring at 40 may be performed in a variety of manners. In one embodiment, classification may be at least partly based on unusual access patterns over a period of time, such as repeated login attempts by a single source using different user IDs and/or credentials, an excessively high rate of login requests or other behavior indicating that a machine (computer) rather than a human may be the source of the request, an excessively high number of failed authentication requests by a source, etc. Techniques for monitoring accesses and classifying the sources by risk are generally known and not elaborated herein. It is noted that the classification may be a simple binary classification (i.e., source is broadly trusted or is broadly untrusted), or it may be a more multi-level classification that may employ a multi-valued "risk score" for example, in which case low-risk sources may be distinguished from high-risk sources by a predetermined threshold risk score. Note that this use of scores is distinct from the above-mentioned example use of authentication result scores between the authentication system 18 and the access server 20. However generated, the classification information generated at 40 is recorded so as to be usable for subsequent access requests.

At 42 and 44 are operations performed during access requests from sources that have been classified at 40 based on some number of preceding access requests. At 42 is operation for low-risk sources, which includes use of a normal authentication process that has differential success/fail behavior that may expose information as outlined above (e.g., whether user ID is valid, type of authentication, etc.). In this case, however, the source is trusted and thus the exposure of such information is assumed to entail low risk. In contrast, the operation at 44 for high-risk sources employs a different authentication process that reflects the lack of trust in the source. In particular, the authentication system 18 employs a false authentication process having non-differential behavior that does not expose such information. Specific examples are discussed below. In general, it is desired that sources deemed to be high risk will be unable to obtain information by observing differential behavior. These high-risk sources will not be authenticated, and each high-risk source will always observe the same behavior even across attempted accesses of different system resources, such as occurs in an enumeration attack for example. Because a high-risk source is presented only with this non-differential behavior, the source is unable to learn information that can be used in a subsequent more targeted attack.

One straightforward example of the general process of FIG. 3 is the following. It is assumed that monitoring and classification occur in an ongoing manner at 40 as described above, and that a first source A has become classified as trusted or low-risk, and a second source B has become classified as untrusted or high-risk (i.e., a potential attacker). Normal authentication occurs by presentation of a valid user ID and a corresponding user-specific password. The authentication system 18 maintains records of all valid {user ID, password} tuplets. During an authentication, it first checks that a user ID presented in the authentication request is found among the recorded user IDs, then checks that a password also presented in the authentication request matches the password recorded with the valid user ID.

The low-risk source A experiences the normal authentication at 42, which may proceed as follows. The user 12 may be presented with a login screen in which a user ID and password are entered. The authentication system 18 compares the entered values against recorded values as described above. If a matching user ID and associated password are found, the login is successful and the user is granted access to the service provided by the service system 10. This may be observed by the user as now being presented with an initial screen of the service, such as a listing of accounts in an online banking application for example. If a matching user ID and associated password are not found, the login is unsuccessful and the user may be either denied access or asked to repeat the login attempt, either of these being observed by the user as being presented with corresponding screens for service denial notification and/or a repeating of the login. It will be appreciated that there is differential success/fail behavior, as in the success case the response is an initial screen of the service while in the fail case the response is a denial notification and/or re-presentation of the login screen.

In contrast, the high-risk source B experiences the false authentication at 44, which may be as simple as presenting a service denial notification to the requesting user irrespective of whether the user ID and/or password of the request matches a valid {user ID, password} recorded tuplet. Thus no matter what specific user ID and/or password are included in a request from a high-risk source, the response is always the same service denial notification. It will be appreciated that there is thus non-differential success/fail behavior in this case, so no information is exposed about validity of user IDs/passwords, authentication policies or procedures, etc.

Figure 4:
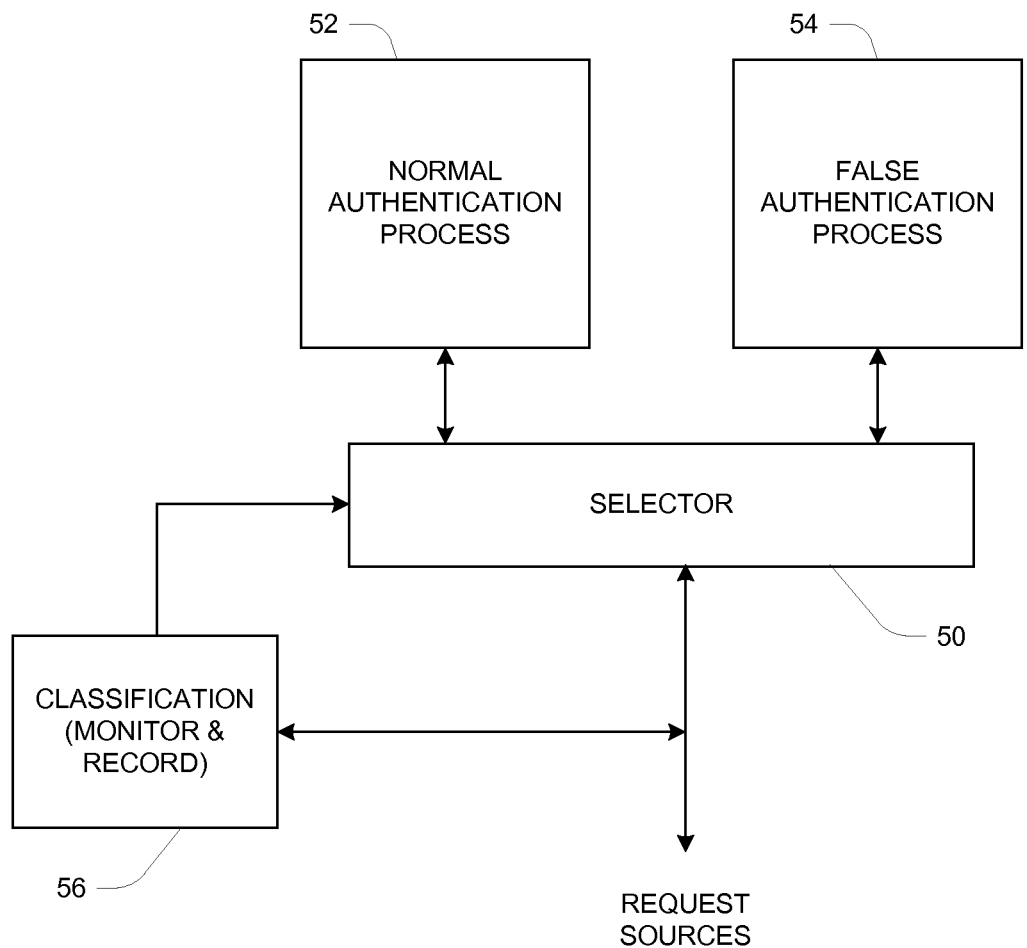
FIG. 4 is a schematic diagram of an organization of functional modules for performing the processing of FIG. 3.

FIG. 4 shows an organization of functional modules for performing the processing of FIG. 3. The arrangement includes a selector 50 that selects either the normal authentication process 52 or the false authentication process 54 for interacting with the sources of requests. The selection is controlled by a classification module 56 that monitors the interactions of the sources with the system and records risk values accordingly, then based on the recorded risk values controls the selector 50 to employ the desired process 52 or 54 for a given source.

Various specifics and alternatives for the general functionality described above are now presented.

For purposes of recording distinct sources of requests, it may be convenient to use a hash or digest of a set of source-identifying information accompanying each request. For example, certain relatively static information such as IP address, port numbers etc. may be extracted from the packets of requests and a hash value calculated from the extracted information. The hash value can be used in the classification record to identify the respective source, generally reducing the amount of storage required for recording the classification information.

Regarding the non-differential behavior at 44 in FIG. 3, one simple example is presentation of a service denial screen as outlined above. In another example, the false authentication process may present a screen soliciting additional input from a user for apparent use in later authentication steps. This may limit the ability of automated attack processes (so-called "bots") to continue authentication. In yet another example, the response to a high-risk source may include a payload of executable code that will begin executing on the source computer. This type of response can slow down operation of a source machine, reducing its ability to mount a so-called distributed denial-of-service (DDOS) attack for example. DDOS attacks rely on substantially flooding a service with requests in a very short period of time, and thus they may be foiled by responses that inhibit their ability to do this. Executable code may be delivered in the form of scripts such as Javascript® scripts.

In another aspect, the processes described above may be augmented by other operations as an expansion or refinement. One aspect of the process of FIG. 3 is its requirement of some initial period of operation in which a given source becomes classified as either low-risk or high-risk. During such an initial period, there may be different ways in which requests from not-yet-classified sources are handled. In one approach, an unclassified source may initially be treated as low-risk until its behavior causes it to become classified as high-risk. One drawback of this approach is that an attacker may be able to obtain some information by differential behavior occurring during the initial, pre-classification period. This may be acceptable in some systems/applications in benign operating environments or having greater inherent risk tolerance. If a more aggressive approach is desired, the opposite may be done—a source may be deemed high-risk until in proves itself low-risk. In this case, the source is initially given a response that will continue as the false authentication response if the source should eventually become classified as high-risk, and only upon becoming classified as low-risk will the response change to the true, information-exposing, normal authentication behavior 42. It will be appreciated that in this case the false response is preferably something that can be used during the initial period to monitor the source behavior for determining whether the source is in fact low-risk. This is where an information-soliciting screen as discussed above may be used, for example. During the initial period the information entered into the screen may be used in assessing whether the source of the request is a legitimate source, leading to an eventual classification as low-risk for purposes of later accesses. If during the initial period the source becomes assessed as non-legitimate or fraudulent, leading to a classification as high-risk, subsequent false authentication processes at 44 may continue to use this same screen, even though the information entered into it is actually not used and the access is consistently denied in a non-differential manner.

While various embodiments of the invention have been particularly shown and described, it will be understood by those skilled in the art that various changes in form and details may be made therein without departing from the spirit and scope of the invention as defined by the appended claims.

What is claimed is:

1. A method performed by an authentication computer of a distributed computing system of processing authentication requests for authentication of unauthenticated users attempting to access a protected system of the distributed computing system, comprising:
    in an ongoing classification operation, receiving the authentication requests in authentication request messages and monitoring the content of the authentication requests and resulting authentication results, and, based on the monitoring, assigning and recording risk values in association with information identifying respective sources of the authentication requests, the sources coupled to the distributed computing system by a network, the recorded risk values identifying low-risk sources making normal authentication requests and high-risk sources making abnormal authentication requests indicative of fraud activity;
    for new authentication requests for first sources identified by the recorded risk values as low-risk sources, employing a normal authentication process having differential success/fail response behavior visible to the first sources that exposes information to the first sources about an enumerable access control resource of the protected system; and
    for new authentication requests for second sources identified by the recorded risk values as high-risk sources, employing a false authentication process having non-differential success/fail response behavior visible to the second sources that does not expose the information about the enumerable access control resource to the second sources,
    wherein the differential success/fail response behavior includes (a) in a success case, granting access to the protected system, and (b) in a fail case, denying access to the protected system, and the non-differential success/fail response behavior includes (c) denying access to the protected system in both the success case and the fail case, and presenting the same access denial response in both cases.

2. A method according to claim 1, wherein:
    the enumerable access control resource of the protected system is a record of user computer accounts associated with respective users authorized to use the protected system, each user computer account having an associated valid user identifier;
    the classification operation for a given source includes monitoring for a predetermined pattern of unsuccessful authentication requests from the source, each unsuccessful authentication request including a respective invalid user identity not matching the valid user identifier of any of the user computer accounts.

3. A method according to claim 2, wherein the predetermined pattern of unsuccessful authentication requests is a set of requests over a predetermined period using a succession of different invalid user identities.

4. A method according to claim 1, wherein the false authentication process includes delivery of an executable script to the source to cause the source to expend time and computing resources executing the executable script before it can generate another authentication request.

5. A method according to claim 1, wherein the normal authentication process includes a first sub-process of a nominal authentication strength and selective use of a second sub-process of a higher authentication strength based on a heightened security sensitivity of the enumerable access control resource, and the information exposed about the enumerable access control resource includes the existence of the heightened security sensitivity inferable from observing the selective use of the second sub-process.

6. A method according to claim 5, wherein the second sub-process includes one or more of one-time-password based authentication and knowledge-based authentication.

7. A method according to claim 1, wherein, during an initial period in which a given source is not yet classified as either low-risk or high-risk, processing requests from the source according to a predetermined assumed risk level.

8. A method according to claim 7, wherein the given source is treated as a low-risk source and is authenticated using the normal authentication process during the initial period.

9. A method according to claim 7, wherein the given source is treated as a high-risk source and authenticated with an initial authentication process that mimics the false authentication response from the perspective of the given source but within the system provides authentication information about the given source that is used both to authenticate the given source and as input to the ongoing classification of the given source.

10. A method according to claim 9, wherein the given source becomes classified as a high-risk source at the end of the initial period, and subsequent access requests from the given source are processed using the false authentication response and the given source is not authenticated irrespective of validity of the information provided for the source during the false authentication process.

11. A method according to claim 9, wherein the given source becomes classified as a low-risk source at the end of the initial period, and subsequent access requests from the given source are processed using the normal authentication process.

12. A method according to claim 1, wherein the protected system is coupled to a public network and is vulnerable to brute-force or distributed denial of service attacks from anonymous users initiating authentication requests via the public network.

13. A method according to claim 1, wherein the risk values are recorded in association with identifiers of the respective sources, the identifiers containing source-specific information from network-layer communications of the sources.

14. A method according to claim 13, wherein the source-specific information for a given source is obtained from network address of the given source.

15. A method according to claim 13, wherein the source-specific information is obtained by calculating a hash value from a larger collection of network-layer information from the network-layer communications.

16. Apparatus usable as an authentication computer of a distributed computing system, comprising:
- one or more processors;
- memory;
- input/output interface circuitry; and
- interconnect circuitry coupling the processors, memory and input/output interface circuitry together for data transfer therebetween,
- the memory storing computer program instructions executable by the processor to cause the apparatus to perform a method of processing authentication requests for authentication of unauthenticated users attempting to access a protected system of the distributed computing system, the method including:
  - in an ongoing classification operation, receiving the authentication requests in authentication request messages and monitoring the content of the authentication requests and resulting authentication results, and, based on the monitoring, assigning and recording risk values in association with information identifying respective sources of the authentication requests, the sources coupled to the distributed computing system by a network, the recorded risk values identifying low-risk sources making normal authentication requests and high-risk sources making abnormal authentication requests indicative of fraud activity;
  - for new authentication requests for first sources identified by the recorded risk values as low-risk sources, employing a normal authentication process having differential success/fail response behavior visible to the first sources that exposes information to the first sources about an enumerable access control resource of the protected system; and
  - for new authentication requests for second sources identified by the recorded risk values as high-risk sources, employing a false authentication process having non-differential success/fail response behavior visible to the second sources that does not expose the information about the enumerable access control resource to the second sources,
  - wherein the differential success/fail response behavior includes (a) in a success case, granting access to the protected system, and (b) in a fail case, denying access to the protected system, and the non-differential success/fail response behavior includes (c) denying access to the protected system in both the success case and the fail case, and presenting the same access denial response in both cases.

17. A non-transitory computer-readable medium storing computer program instructions, the instructions being executable by an authentication computer of a distributed computing system to cause the authentication computer to perform a method of processing authentication requests for authentication of unauthenticated users attempting to access a protected system of the distributed computing system, the method including:
- in an ongoing classification operation, receiving the authentication requests in authentication request messages and monitoring the content of the authentication requests and resulting authentication results, and, based on the monitoring, assigning and recording risk values in association with information identifying respective sources of the authentication requests, the sources coupled to the distributed computing system by a network, the recorded risk values identifying low-risk sources making normal authentication requests and high-risk sources making abnormal authentication requests indicative of fraud activity;
- for new authentication requests for first sources identified by the recorded risk values as low-risk sources, employing a normal authentication process having differential success/fail response behavior visible to the first sources that exposes information to the first sources about an enumerable access control resource of the protected system; and
- for new authentication requests for second sources identified by the recorded risk values as high-risk sources, employing a false authentication process having non-differential success/fail response behavior visible to the second sources that does not expose the information about the enumerable access control resource to the second sources,
- wherein the differential success/fail response behavior includes (a) in a success case, granting access to the protected system, and (b) in a fail case, denying access to the protected system, and the non-differential success/fail response behavior includes (c) denying access to the protected system in both the success case and the fail case, and presenting the same access denial response in both cases.

* * * * *